Patented July 23, 1940

2,209,292

UNITED STATES PATENT OFFICE 2,209,292

ABRASIVE AND PROCESS OF PRODUCING SAME

John H. Berger, White Plains, N. Y., assignor to American Cyanamid Company, New York, N. Y., a corporation of Maine No Drawing. Application September 13, 1939, Serial No. 294,702

10 Claims. (Cl. 51—298)

This invention relates to abrasive articles and processes of manufacturing the same.

An object of this invention is to improve abrasive articles, particularly those which are molded from compositions containing an abrasive grit bonded with a synthetic resin.

Another object of this invention is to improve the mixing of abrasive grit with synthetic resins, particularly those of the aminotriazine-aldehyde type.

Still another object of this invention is to produce improved abrasives bonded with melamine-formaldehyde resins.

These and other objects are attained by mixing a synthetic resin of the aminotriazine-aldehyde type with abrasive particles or abrasive grit which has been previously wet with a solvent for the resin.

The following examples, in which the proportions are given as parts by weight, are given by way of illustration and not in limitation.

Example 1

| | Parts |
|---|---|
| Aluminum oxide abrasive grit, 40 mesh | 1000 |
| Ethylene glycol | 10–15 |
| Resin "A" (spray dried melamine formaldehyde resin) (1:2 ratio) | 100–150 |
| Phosphoric acid | 0.5–1 |

The dry abrasive grit is charged into a suitable mixer and the ethylene glycol is added. The grit and ethylene glycol are mixed until the former is thoroughly wet or coated with the latter. The phosphoric acid may be mixed with the glycol or it may be mixed with the resin. The resin is then added slowly with constant agitation and mixing is continued until a uniform mixture is obtained. This mixture is molded (at room temperature) for about three minutes at 500–4000 pounds/square inch pressure. The curing of the molded article will depend somewhat on its size and shape. Generally the molded article may be cured at relatively low temperatures (e. g., 80° C.) until initially set. Usually about one to twenty-four hours is sufficient. This should be followed by curing at temperatures at about or above 100° C., e. g., 110°–150° C. The higher temperature is preferably maintained for about twelve to twenty-four hours or until optimum properties are attained. The resulting molded abrasive has desirable properties such as heat resistance, high strength, etc.

Example 2

| | Parts |
|---|---|
| Aluminum oxide grit, 40 mesh | 1000 |
| Ethylene glycol | 10 |
| Furfural | 15 |
| Resin "A" | 100–150 |
| Phosphoric acid or phthalic acid | 0.5–1 |

The procedure of Example 1 is repeated using a mixture of ethylene glycol and furfural in place of the ethylene glycol.

Example 3

| | Parts |
|---|---|
| Aluminum oxide grit, 40 mesh | 1000 |
| Benzaldehyde | 25 |
| Ethylene glycol | 10 |
| "Cellosolve" | 5 |
| Resin "A" | 100–150 |
| Phosphoric or phthalic acid | 0.5–1 |

The procedure of Example 1 is repeated using a mixture of the benzaldehyde, ethylene glycol and "Cellosolve" as the wetting medium instead of the glycol alone.

Example 4

| | Parts |
|---|---|
| Aluminum oxide grit, 40 mesh | 1000 |
| Ethylene glycol | 10 |
| Toluene | 20 |
| "Cellosolve" | 12–14 |
| Oil modified alkyd resin | 20 |
| Resin "A" | 100–150 |
| Phosphoric or phthalic acid | 0.5–1 |

The glycol, toluene, "Cellosolve", and alkyd resin are mixed to form a clear solution. This solution is used as the wetting medium and the procedure of Example 1 is followed.

Example 5

| | Parts |
|---|---|
| Aluminum oxide grit, 40 mesh | 1000 |
| Ethylene glycol | 10 |
| Furfural | 10 |
| Oil modified alkyd resin | 10 |
| "Cellosolve" | 12–14 |
| Resin "A" | 100–150 |
| Phosphoric acid | 0.5–1 |

The glycol, furfural, alkyd resin and "Cellosolve" are mixed to form a clear solution and the resulting solution used in place of ethylene glycol in following the procedure of Example 1.

Example 6

| | Parts |
|---|---|
| Aluminum oxide grit, 40 mesh | 1000 |
| Glycerol | 15–17 |
| Resin "A" | 150 |
| Phosphoric acid | 0.5–1 |

The glycerol is substituted for the glycol in following the procedure of Example 1.

Other sizes of grit may be used. With finer grits slightly more resin may be required while with the larger sized grits somewhat less resin may be used.

Other melamine-formaldehyde resins may be substituted for the Resin "A" used in the above examples, e. g. alkylated melamine-formaldehyde resins, melamine-formaldehyde resins having a higher ratio of formaldehyde to melamine (such as 1:3 and 1:4). Furthermore mixed urea-melamine formaldehyde resins are also particularly suitable as well as the other resins mentioned below.

Among the solvents for resins of the aminotriazine-aldehyde type which may be used, the polyhydric alcohols are particularly suitable. Polyhydric alcohols which are suitable are any of those which are compatible with the particular aminotriazine to be used. Among these the following are included: ethylene glycol, diethylene glycol, polyethylene glycols e. g. tri-, tetra-, penta-, and hexa- ethylene glycols, alpha-propylene glycol, glycerol, the monoalkyl ethers of glycerol, etc. Other substances which also exhibit wetting properties with aminotriazine-aldehyde resins are the "Cellosolves" (e. g. the monoethyl ether of ethylene glycol) and polyhydroxy compounds which are compatible with the resin used. It has been found that a solution of resorcinol and ethanol (about 50% of each) is also suitable. Monohydric alcohols alone are generally not suitable for this purpose but it may be desirable to use mixtures of the polyhydric alcohol with a monohydric alcohol. Mixtures of a polyhydric alcohol with one of the "Cellosolves" have been found to be particularly effective. Mixtures of polyhydric alcohols (with or without a monohydric alcohol) with benzaldehyde or furfural are also quite effective. While furfural and benzaldehyde are not suitable alone, either of these materials or mixtures of them appear to improve the effect of the glycol or other polyhydric alcohol. Other aldehydes or mixtures of aldehydes which are compatible with or soluble in a polyhydric alcohol and which may react with an aminotriazine resin may also be used. It has also been found to be advantageous to employ mixtures of alkyd resins, preferably oil-modified alkyd resins, in combination with the polyhydric alcohol, and with or without the addition of other wetting materials.

While melamine-formaldehyde resins are generally preferred as the bonding material, other aminotriazine-aldehyde resins may be used. Among these are resins produced by condensing an aldehyde e. g. formaldehyde, acetaldehyde, propionaldehyde, butyraldehyde, hexaldehyde, heptaldehyde, crotonaldehyde, allylaldehyde, benzaldehyde, cinnamylaldehyde, furfural, etc. with one or more of the aminotriazines e. g. melamine and its derivatives such as 2,4,6-triethyl- and -triphenyl-triamino-1,3,5-triazines, 2,4,6-trihydrazino-1,3,5 triazine and the corresponding condensed triazines such as melam and melem, as well as triazines containing one or two amino groups such as ammeline, ammelide, formoguanamine, 2-amino-1,3,5-triazine and their substitution products, as well as nuclear substituted aminotriazines such as 2-chloro-4,6 diamino-1,3,5-triazine, 2 phenyl-4 amino-6-hydroxy 1,3,5 triazine, 6 methyl-2,4-diamino-1,3,5-triazine. Obviously commercial mixtures of the various triazines or mixtures thereof with other amino compounds may be used if desirable. One example of such commercial mixtures is the product obtained by heating dicyandiamide sufficiently to obtain a significant amount of melamine, together with other reactive amino bodies. Furthermore, other amino materials may be used in admixture with the triazines e. g. urea, thiourea, dicyandiamide, cyanamide, etc. In some instances it is also desirable to react other substances with formaldehyde in conjunction with the aminotriazines or mixtures of aminotriazines and other substances, e. g., phenol, aniline, phenylene diamine, quinoline, etc.

Condensation products may be produced by any suitable process and with any desired combining ratio of aldehyde to aminotriazine or other reactive materials from 1:1 up to 5:1, or even higher. Furthermore, the condensation products may be alkylated if desired with any suitable alcohols such as ethanol, propanol, butanol, amyl alcohol, cyclohexanol, benzyl alcohol, etc.

While resins produced by condensing formaldehyde or other aldehyde with an aminotriazine or condensed aminotriazine give excellent results, it may be desirable to incorporate therewith other resins such as urea-formaldehyde resin, dicyandiamide-formaldehyde resin, thiourea-formaldehyde resin, mixed urea-thiourea-formaldehyde resins, phenol-formaldehyde resins, alkyd resins, etc. These resins may be made separately and then mixed with the aminotriazine resin or they may be made by reacting all of the materials simultaneously as indicated above. Mixed resins suitable for use according to this invention are those containing a substantial proportion of aminotriazine, e. g., at least about 20% of the total material capable of reacting with formaldehyde in order to obtain superior characteristics which distinguish the abrasive articles of this invention from those previously produced.

Other bonding materials may be incorporated with the resins such as plaster of Paris and lead oxide. Furthermore various fillers may be incorporated if desirable, e. g. clay.

While it is not necessary to use an accelerator, somewhat better results are obtained if an accelerator be used. Either acid or basic catalysts may be used as desirable. The preferred catalysts include acidic substances such as phthalic acid, phthalic anhydride, tartaric acid, phosphoric acid, etc. Other catalysts which are preferred, especially if the abrasive articles be hot molded, are those of the latent catalyst or delayed action type and which include the reaction products of a tertiary amine such as triethanolamine with an acid such as those mentioned above and which may be produced by reacting the acid in water with the tertiary amine, at about 65° C. to produce a substantially neutral product. Other catalysts such as the acyl imides, e. g., benzoyl phthalimide may also be used.

When dry resins are used as the bonding materials, the articles may be molded cold at pressures of about 100–5000 pounds/square inch and subsequently cured in ovens at a suitable curing temperature e. g. about 80°–200° C. Obviously the curing may be done either at atmospheric pressure or at any elevated pressure desired. Optionally the mixture of resin and abrasive material may be molded and cured in hot molds at temperatures of 100°–200° C. and at pressures up to about 5000 pounds/square inch. The time required for curing will obviously vary according to the temperatures and pressures used and the size and shape of the molded piece, as well as according to the particular resin which is being cured. Generally, when hot molded, several minutes is sufficient to completely cure the resinous bonding agent. On the other hand, several hours up to forty-eight or more hours may be taken to cure cold molded articles.

In producing abrasive articles such as sandpapers and sanding cloths it may be desirable to use resinous syrups obtainable by refluxing the aminotriazine with the aldehyde in aqueous solution (with or without subsequent alkylation with an alcohol such as butanol). Furthermore, in making molded articles it may sometimes be desirable to employ resinous syrups rather than dry resin. Generally, it is preferable to use dry resins in the preparation of molded abrasives. For this purpose a melamine-formaldehyde resin, the molar ratio of melamine to formaldehyde being preferably about 1:2 to 1:4, which has preferably been spray-dried is mixed with a suitable abrasive grit previously wet with a polyhydric alcohol with or without the addition of furfural, benzaldehyde or other such materials. The resin bonding agent may also be drum-dried, vacuum-dehydrated, etc.

The molded abrasives may be cemented to a cloth backing after being formed or if desirable they may be molded to a cloth backing initially. For this purpose it may be desirable to impregnate the cloth with an aminotriazine-aldehyde resinous syrup or other amino-aldehyde resinous syrup prior to molding. Obviously other resinous syrups such as phenol-formaldehyde syrups could also be used. In this way an abrasive article is produced which may be affixed to the moving plate of the machine to which the abrasive is to be attached.

In some instances it may be desirable to reinforce the abrasive article with paper or fabric, preferably impregnated with the same type of resin which is to be used as the bonding material for the abrasive.

Somewhat superior abrasives for special purposes may be produced by mixing a suitable abrasive grit which may have been wet with a polyhydric alcohol (with or without other wetting materials) with an amino triazine-aldehyde resin and a filler material, e. g., cellulose pulp which has been impregnated with an aminotriazine resin or with another resin e. g. phenol formaldehyde resin, urea-formaldehyde resin, or various mixed resins such as those mentioned for use as the principal bonding material for the abrasive particles.

The process described in this specification is suitable for use with any type of abrasive grit but it is especially suitable for silicon carbide grits, aluminum oxide grits, fused alumina, diamond grit, bort, garnet, quartz, emery and other abrasive materials.

Obviously many modifications in the processes and in the articles of the type described above may be made without departing from the spirit and scope of the invention as defined in the appended claims.

I claim:

1. Abrasive grit wetted with a solvent for an aminotriazine-aldehyde resin and bonded with a resin containing an aminotriazine-aldehyde condensation product.

2. An abrasive article formed from a mixture comprising an aminotriazine-aldehyde resin and abrasive grains having their surfaces previously moistened with a polyhydric alcohol.

3. An abrasive article formed from a mixture comprising a resin obtainable by condensing a composition including an aminotriazine with formaldehyde, together with abrasive grains having their surfaces previously wetted with a polyhydric alcohol.

4. An abrasive article formed from a mixture comprising a melamine-formaldehyde resin and abrasive grains having their surfaces previously moistened with a polyhydric alcohol.

5. An article as in claim 4 in which the polyhydric alcohol is a glycol.

6. An article as in claim 4 in which the polyhydric alcohol is glycerol.

7. An abrasive article formed from a mixture comprising an aminotriazine resin and abrasive grains having their surfaces wetted with a combination of solvents for the aminotriazine-aldehyde resin at least part of said solvent being reactive with the aminotriazine-aldehyde resin.

8. A process which comprises thoroughly wetting an abrasive grit with a wetting solution containing a polyhydric alcohol, mixing the wetted grit with an aminotriazine-aldehyde resin and subjecting the mixture to polymerization conditions.

9. A process which comprises wetting an abrasive grit with a polyhydric alcohol mixing the wetted grit with a melamine-formaldehyde resin, shaping the mixture and subjecting the shaped mixture to polymerization conditions.

10. A process which comprises wetting an abrasive grit with a polyhydric alcohol, mixing the wet grit with a melamine-formaldehyde resin, molding the mixture and subjecting the molded mixture to polymerization conditions.

JOHN H. BERGER.

DISCLAIMER 2,209,292.—*John H. Berger*, White Plains, N. Y. ABRASIVE AND PROCESS OF PRODUCING SAME. Patent dated July 23, 1940. Disclaimer filed May 5, 1944, by the assignee, *American Cyanamid Company*.

Hereby enters this disclaimer to that part of claim 1 which covers any material except those which are prepared by mixing an aminotriazine-aldehyde condensation product with abrasive grit which has been previously wet with a solvent for said condensation product.

[*Official Gazette June 6, 1944.*]